United States Patent
Joseph et al.

(10) Patent No.: US 10,846,571 B2
(45) Date of Patent: Nov. 24, 2020

(54) SYSTEM AND METHOD FOR RECOGNIZING LOGOS

(71) Applicant: Cognizant Technology Solutions India Pvt. Ltd., Chennai (IN)

(72) Inventors: Rajkumar Joseph, Chennai (IN); Gundimeda Venugopal, Hyderabad (IN); Vinayaka Raj, Kanyakumari District (IN); Mahesh Balaji, Chennai (IN)

(73) Assignee: COGNIZANT TECHNOLOGY SOLUTIONS INDIA PVT. LTD, Chennai (IN)

(*) Notice: Subject to any disclaimer, the term of this patent is extended or adjusted under 35 U.S.C. 154(b) by 102 days.

(21) Appl. No.: 16/214,495

(22) Filed: Dec. 10, 2018

(65) Prior Publication Data

US 2020/0090007 A1 Mar. 19, 2020

(30) Foreign Application Priority Data

Sep. 17, 2018 (IN) .............................. 201841034905

(51) Int. Cl.
*G06K 9/62* (2006.01)
*G06T 7/13* (2017.01)
*G06F 16/583* (2019.01)
*G06K 9/32* (2006.01)

(52) U.S. Cl.
CPC ....... *G06K 9/6267* (2013.01); *G06F 16/5862* (2019.01); *G06K 9/3233* (2013.01); *G06K 9/6223* (2013.01); *G06T 7/13* (2017.01); *G06K 2209/25* (2013.01)

(58) Field of Classification Search
CPC .. G06K 9/3233; G06K 9/6223; G06K 9/6267; G06K 2209/25; G06T 7/13; G06F 16/5862
USPC .................................. 382/181, 209, 218, 305
See application file for complete search history.

(56) References Cited

U.S. PATENT DOCUMENTS

| | | | |
|---|---|---|---|
| 9,904,956 B2 * | 2/2018 | Wang | G06K 9/00442 |
| 10,007,863 B1 * | 6/2018 | Pereira | G06T 7/60 |
| 2009/0173791 A1 * | 7/2009 | Pine | A61B 90/98 |
| | | | 235/454 |
| 2012/0144499 A1 | 6/2012 | Tan | |

* cited by examiner

*Primary Examiner* — Daniel G Mariam
(74) *Attorney, Agent, or Firm* — Cantor Colburn LLP (57) ABSTRACT

A system, a method, and a computer program product for recognizing a logo from an image is provided. The method comprises receiving and preprocessing an image that contains the logo to be recognized. The method further comprises detecting text of the logo to recognize the logo. The method furthermore comprises extracting local and global features of a region of interest associated with the logo to recognize the logo if the text is not detected in the logo. The method further comprises detecting one or more signs in proximity of the logo to recognize the logo if the logo is not recognized by extracting the local and global features of the logo. The method finally comprises identifying a region where the logo is present in the pre-processed image to recognize the logo if the logo is not recognized by detecting the one or more signs in proximity of the logo.

20 Claims, 3 Drawing Sheets

SYSTEM AND METHOD FOR RECOGNIZING LOGOS

CROSS REFERENCE TO RELATED APPLICATION

This application is related to and claims the benefit of Indian Patent Application Number 201841034905 filed on Sep. 17, 2018, the contents of which are herein incorporated by reference in their entirety.

FIELD OF THE INVENTION

The present invention relates generally to image processing. In particular, the present invention relates to a method and system for processing an image to detect and recognize a logo present in the image.

BACKGROUND OF THE INVENTION

Logo recognition in images is a key objective in a wide range of applications like trademark infringement detection, contextual advertisement placement, vehicle logo for intelligent traffic-control systems, automated computation of brand-related statistics on social media, augmented reality, and counterfeit products identification.

The industry currently uses multiple solutions to extract the logo information from the images and recognize them. However, these solutions are either very time consuming or do not provide accurate results or are not scalable in real time. For example, known logos can be quickly detected and recognized using object detection techniques but the solutions fail on scalability. For some of the existing solutions, the accuracy of the solutions goes down when the logos are in the form of symbols or have typographic content. The accuracy of the existing solutions also goes down when the logos are variations of existing logos. Further, while some of the existing solutions that employ neural networks and other artificial intelligence techniques provide accurate results but these solutions suffer from high computational time and are thus less efficient. The neural network based solutions also suffer from continuous re-training of the datasets when there are new or variants of the known or existing logos. Thus, each of the existing solutions have one or more drawbacks.

In light of the above, there is a need for a solution that allows recognition of logos from images in an accurate and efficient manner. There is also a need for a solution that can recognize variants of existing logos. Furthermore, there is a need for a solution that is scalable in real time.

SUMMARY OF THE INVENTION

In an embodiment of the preset invention, a system for recognizing a logo from an image is provided. The system comprises an image processing module that is configured to receive an image from an image capturing device and pre-process the received image. The received image comprises a logo to be recognized. The logo in the received image may be at least one of: a text based logo, a symbol based logo, and a combination of text and symbol. The system further comprises a logo database comprising a plurality of logos. In an embodiment of the present invention, the logo in the received image may be one of: a logo existing in the logo database and a variant of the existing logo that is absent in the logo database. The system may further comprise a logo recognition controller that is configured to receive the pre-processed image and sequentially send the pre-processed image to a text based logo recognition module, an image based logo recognition module, a sign based logo recognition module, and a region based logo recognition module for detecting and recognizing the logo present in the pre-processed image.

The text based logo recognition module is configured to recognize the logo by detecting text of the logo present in the pre-processed image. The text based logo recognition module detects the text using optical character recognition technique. Upon detecting the text, the text based logo recognition module compares the detected text with text of the logos present in the logo database such that a match corresponds to the recognition of the logo.

The image based logo recognition module is configured to recognize the logo by extracting one or more local and global features of a region of interest associated with the logo present in the pre-processed image if the text based logo recognition module fails to recognize the logo. The image based logo recognition module further compares the extracted one or more local and global features of the logo present in the pre-processed image with the one or more local and global features of the existing logos present in the logo database such that a match corresponds to the recognition of the logo.

The sign based logo recognition module is configured to recognize the logo by detecting one or more signs in proximity of the logo present in the pre-processed image if the image based logo recognition module fails to recognize the logo. The one or more signs detected by the sign based logo recognition module are in proximity of the logo to be recognized and are detected through an object detection technique. Further, the detection of the one or signs shortlists the logo as a potential logo candidate. The sign based logo recognition module then extracts edges of the potential logo candidate and classifies the extracted edges with the edges of a nearest neighbor from the existing logos. The classification of the extracted edges of the potential logo candidate with the edges of the nearest neighbor from the existing logos facilitates in recognition of the logo present in the pre-processed image.

The region based logo recognition module configured to recognize the logo by identifying a region where the logo may be present in the pre-processed image if the sign based logo recognition module fails to recognize the logo. The region based logo recognition module may identify the region by applying color segmentation and texture segmentation techniques. The identification of the region may facilitate in shortlisting a potential logo candidate. Thereafter, the region based logo recognition module extracts edges of the potential logo candidate and classifies the extracted edges with the edges of a nearest neighbor from the existing logos. The classification of the extracted edges of the potential logo candidate with the edges of the nearest neighbor from the existing logos facilitates in recognition of the logo present in the pre-processed image.

Further in an embodiment of the present invention, a method for recognizing a logo from an image is provided. The method comprises receiving an image from an image capturing device. The received image comprises the logo to be recognized. The logo in the received image is at least one of: a text based logo, a symbol based logo, and a combination of text and symbol. Further, the logo in the received image is one of: a logo existing in a logo database and a variant of the existing logo that is absent in the logo database. The method further comprises pre-processing the received image.

The method furthermore comprises detecting text of the logo to recognize the logo present in the pre-processed image. The detection of the text is achieved using optical character recognition technique. Upon detecting the text, the detected text is compared with text of logos present in a logo database such that a match corresponds to the recognition of the logo.

When the text is not detected in the logo, the method further comprises extracting one or more local and global features of a region of interest associated with the logo to recognize the logo present in the pre-processed image. The extracted one or more local and global features of the region of interest are then compared with the one or more local and global features of existing logos present in a logo database such that a match corresponds to the recognition of the logo.

In case the logo is not recognized by extracting one or more local and global features of the logo, the method further comprises detecting one or more signs in proximity of the logo to recognize the logo present in the pre-processed image. The one or more signs are detected through an object detection technique. Further, the detection of the one or signs shortlists the logo as a potential logo candidate. Thereafter, edges of the potential logo are extracted and are classified with the edges of a nearest neighbor from logos existing in a logo database. The classification of the extracted edges of the potential logo with the edges of the nearest neighbor from the logos existing in the logo database facilitates in the recognition of the logo present in the pre-processed image.

Finally, in case the logo is not recognized by detecting one or more signs in proximity of the logo, the method further comprises identifying a region where the logo is present in the pre-processed image to recognize the logo. The region where the logo is present may be identified by color segmentation and texture segmentation of the pre-processed image. The identification of the region facilitates in shortlisting a potential logo candidate. Thereafter, edges of the potential logo candidate are extracted and are classified with the edges of a nearest neighbor from logos existing in a logo database. The classification of the extracted edges of the potential logo candidate with the edges of the nearest neighbor from the logos existing in the logo database facilitates in the recognition of the logo present in the pre-processed image.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
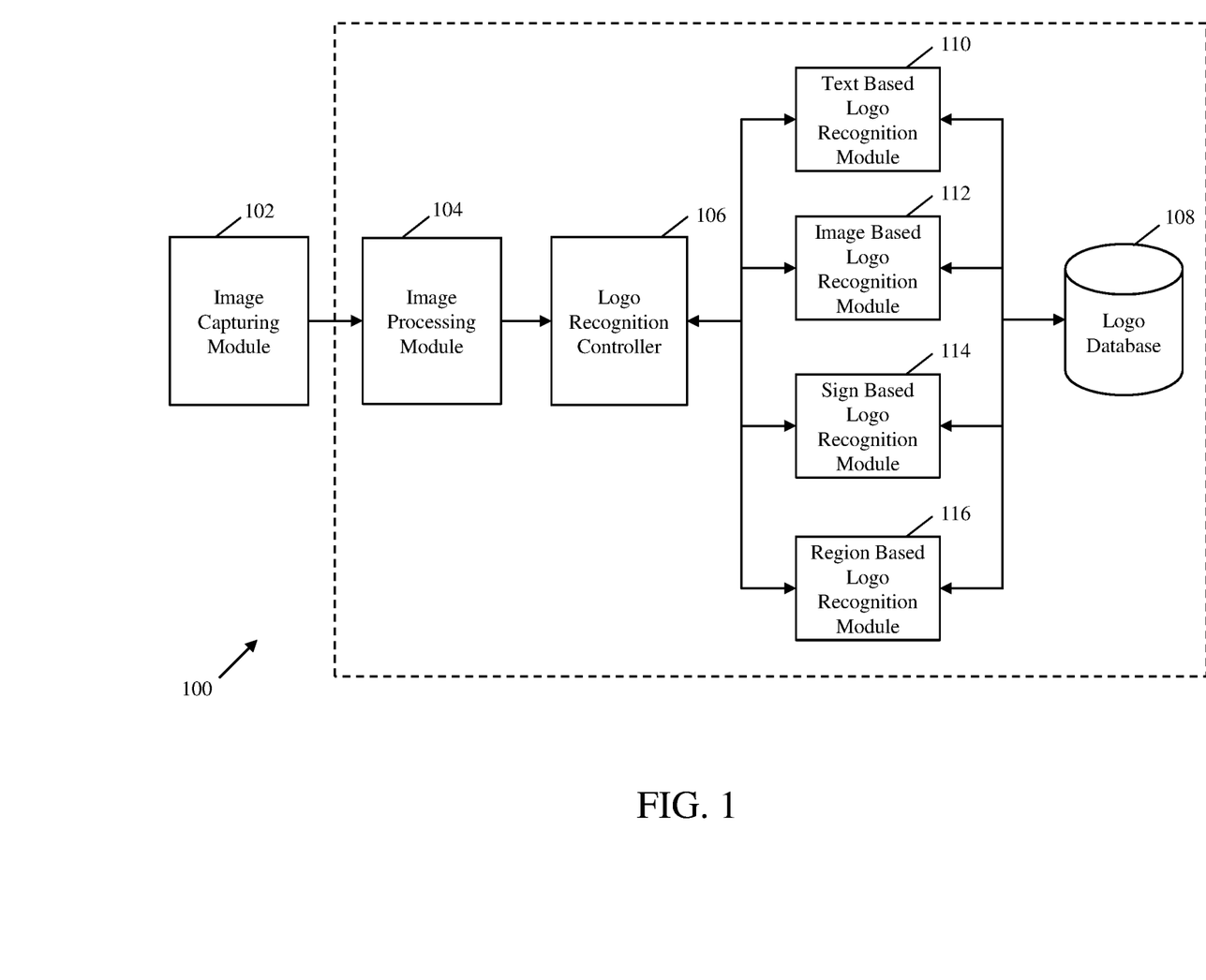
FIG. 1 is a block diagram illustrating a system for extracting a logo from an image in accordance with an embodiment of the present invention.

FIG. 1 is a block diagram illustrating a system 100 for recognizing a logo from an image in accordance with an embodiment of the present invention. The system 100 comprises an image capturing module 102, an image processing module 104, a logo recognition controller 106, a logo database 108 and four different logo recognition modules namely a text based logo recognition module 110, an image based logo recognition module 112, a sign based logo recognition module 114, and a region based logo recognition module 116 for detecting and recognizing the logo in the image The logo in the image may be at least one of: a text based logo, a symbol based logo, and a combination of text and symbol.

The image capturing module 102 is configured to capture the image in which the logo that is to be recognized may be present. In exemplary embodiments of the present invention, the image may be of, without any limitation, a product, product packaging, and an advertising media where the logo may be present. The image may be captured in different lightning conditions to facilitate recognition of the logo using different image processing techniques. Further, in an embodiment of the present invention, the image capturing module may be a digital camera comprising one or more digital image sensors. The digital image sensors may include, without any limitation, Charge-Coupled Device (CCD) sensors and Complementary Metal-Oxide-Semiconductor (CMOS) sensors.

The image processing module 104 is communicatively coupled to the image capturing module 102 and is configured to receive and process the captured image. The image processing module 104 is configured to pre-process the received image, remove unwanted or background regions, and extract a Region of Interest (RoI), associated with the logo, using image processing techniques. In an exemplary embodiment of the present invention, the image processing technique may include, without any limitation, grayscale morphology to estimate the background and subtract it from the original image to extract the Rot The RoI facilitates accurate detection and recognition of the logo in the received image.

The logo recognition controller 106 is configured to receive the pre-processed image from the image processing module 104 and sequentially send the pre-processed image to the text based logo recognition module 110, the image based logo recognition module 112, the sign based logo recognition module 114, and the region based logo recognition module 116 to recognize the logo present in the pre-processed image. The logo recognition controller 106 first sends the pre-processed image to the text based logo recognition module 108. If the text based logo recognition module 110 detects and recognizes the logo within the received image, it sends information about the recognized logo to the logo recognition controller 106. If the text based logo recognition module 110 fails to detect and recognize the logo within the received image, it sends a negative response to the logo recognition controller 106. Upon receiving a negative response from text based logo recognition module 110, the logo recognition controller 106 sends the pre-processed image to the image based logo recognition module 112. If the image based logo recognition module 112 detects and recognizes the logo within the received image, it sends information about the recognized logo to the logo recognition controller 106. If the image based logo recognition module 112 fails to detect and recognize the logo within the received image, it sends a negative response to the logo recognition controller 106. Thereafter, upon receiving the negative response from the image based logo recognition module 112, the logo recognition controller 106 sends the pre-processed image to the sign based logo recognition module 114. If the sign based logo recognition module 114 detects and recognizes the logo within the received image, it sends information about the recognized logo to the logo recognition controller 106. If the sign based logo recognition module 114 fails to detect and recognize the logo within the received image, it sends a negative response to the logo recognition controller 106. Finally, the logo recognition controller 106 sends the pre-processed image to the region based logo recognition module 116 to recognize the logo in the pre-processed image.

The logo database 108 comprises a plurality of logos. The logos may be in the form of text, symbol or a combination of text and symbol. In the context of the present invention, the logos present in the logo database 108 are known as existing logos.

The text based logo recognition module 108 receives the pre-processed image from the logo recognition controller 106. In an embodiment of the present invention, the text based logo recognition module 108 may apply Optical Character Recognition (OCR) technique to the pre-processed image. In case the logo is in the form of the text, the logo gets detected in the image by the application of the OCR technique. The text based logo recognition module 108 then compares the detected text with the text of the logos present in the logo database 108. A match during the comparison process ascertains presence of the logo in the image and also corresponds to the recognition of the logo. The match also indicates that the recognized logo already exists in the logo database 108. The recognized logo and the associated information is then retrieved from the logo database 108 and is shared with the logo recognition controller 106. In case the comparison process does not indicate any match, a negative response is sent to the logo recognition controller 106. The negative response indicates that the text based logo recognition module 108 has failed to recognize the logo as the logo may not be a text based logo or doesn't contain any text and may be in the form of a symbol.

The logo recognition controller 106 upon receiving a negative response from the text based logo recognition module 110, sends the pre-processed image to the image based logo recognition module 112. In an embodiment of the present invention, the image based logo recognition module 112 analyzes and extracts features of the ROI in the pre-processed image to detect the logo. The features correspond to certain visual property of the pre-processed image. The features may include one or more local and global features. The global features describe visual content of the entire pre-processed image and comprise details about color, texture, and shape of the pre-processed image. The local features describe a patch within the pre-processed image and comprise keypoints and descriptors. In an embodiment of the present invention, the image based logo recognition module 112 applies a Joint Composite Descriptor (JCD) to extract 'color' and 'texture' features. The JCD is a combination of Color and Edge Directivity Descriptor (CEDD) & Fuzzy Color and Texture Histogram (FCTH) descriptors. The CEDD and FCTH jointly detect the color and texture features from the pre-processed image. The feature 'shape' is extracted using Gabor technique. The Gabor technique is implemented using a Gabor filter that analyses whether there are any specific frequency content in the image in specific directions in a localized region around the ROI. To extract the keypoints and descriptor, the logo recognition controller 106 employs Harris corner detector, and Oriented FAST and rotated BRIEF (ORB) techniques respectively. The ORB technique is a fusion of FAST (Features from Accelerated Segment Test) keypoint detector and BRIEF descriptor with one or more modifications to get a good accuracy. The ORB technique first employs the FAST keypoint descriptor to identify plurality of keypoints. Thereafter, the Harris corner detector is applied to find top keypoints from the plurality of keypoints to extract the local features. Once the one or more global and local features for the pre-processed image have been extracted, the image based logo recognition module 112 compares these one or more extracted features with the one or more local and global features of the existing logos present in the logo database 108. A match during the comparison process ascertains presence of the logo in the image and also corresponds to the recognition of the logo. The match also indicates that the recognized logo already exists in the logo database 108. The recognized logo and the associated information is then retrieved from the logo database 108 and is shared with the logo recognition controller 106. In case the comparison process does not indicate any match, a negative response is sent to the logo recognition controller 106.

The logo recognition controller 106 upon receiving a negative response from the image based logo recognition module 112, sends the pre-processed image to the sign based logo recognition module 114. In an embodiment of the present invention, the response may be negative because the logo in the pre-processed image may be a variant of an existing logo present in the logo database 108. The variant logo may not be present in the logo database 108 and thus, the image based logo recognition module 112 is not able to detect and recognize the variant of the existing logo.

To detect and recognize the variant of the existing logo, the sign based logo recognition module 114 is configured to first detect one or more signs or symbols like Trademark ($^{TM}$), Registered (®), and Service Mark ($^{SM}$) in the pre-processed images. Since the one or more signs may be in proximity of desired logo, the detection of the one or more signs may facilitate in detection of the logo. In an embodiment of the present invention, the sign based logo recognition module 114 employs object detection technique to detect the one or more signs. In an exemplary embodiment of the present invention, the object detection technique may employ Viola-Jones object detection framework. The Viola-Jones framework may be trained for detecting the one or more signs using Histogram of Oriented Gradients (HOG) descriptor and a cascade classifier. The proximity sign detection reduces the search space and thus, accuracy in detecting and recognizing the logo increases. In an embodiment of the present invention, if a sign is not detected in the pre-processed image, the sign based logo recognition module 114 sends a negative response to the logo recognition controller 106 indicating that the logo could not be detected or recognized. In another embodiment of the present invention, the sign based logo recognition module 114 detects a sign in the pre-processed image. Further, after the sign is detected, the sign based logo recognition module 114 shortlists a potential logo candidate using proximity based detection. Upon, shortlisting the potential logo candidate, the sign based logo recognition module 114 extracts edges or features of the potential logo candidate. In an embodiment of the present invention, the sign based logo recognition module 114 employs a deep neural network and deep autoencoders to extract the edges of the potential logo candidate. The edges are the boundaries between an object or logo and the background. It includes important information about the image, and can provide information on the logo's position. Further, the edges of the potential logo candidate are color invariant. For example, the potential logo candidate with a different foreground or background may be easily detected using its edge information. In an embodiment of the present invention, the deep neural network may be Convolutional Deep Neural Network (CNN) to detect and extract edges of the potential logo candidate. It may be apparent to a person of ordinary skilled in the art that the sign based logo recognition module 114 may also have an access to the edges of the existing logos in the logo database 108. Thereafter, the sign based logo recognition module 114 applies the classifier for detecting and recognizing the logo. In an embodiment of the present invention, the sign based logo recognition module 114 applies K-Nearest Neighbor (K-NN) classifier for the purpose of classification of the edges of the potential logo candidate. The K-NN classifier identifies nearest neighbor for the potential logo based on the predefined value of K and classifies the edges of the potential logo candidate with the edges of a nearest neighbor from the existing logos. Classification of the potential logo candidate with the nearest neighbor from the existing logos facilitates detection and recognition of the logo in the pre-processed image. The recognized logo and the associated information is then retrieved from the logo database 108 and is shared with the logo recognition controller 106. In an embodiment of the present invention, the logo recognition controller may update the logo database 108 with the logo recognized by the sign based logo recognition module 114. Updating the logo database 108 with the newly recognized logo that does not exist in the logo database 108 facilitates in scaling up the whole system of logo recognition in real time. In case the K-NN classifier is unable to classify the potential logo candidate with the nearest neighbor from the existing logos, the sign based logo recognition module 114 sends a negative response to the logo recognition controller 106.

The logo recognition controller 106 upon receiving a negative response from the sign based logo recognition module 114, sends the pre-processed image to the region based logo recognition module 116. In an embodiment of the present invention, the negative response may indicate that the sign based logo recognition module 114 failed to detect any sign, near the existing logo or the variant of the existing logo, in the pre-processed image. In another embodiment of the present invention, the negative response may indicate that the sign based logo recognition module 114 failed to detect or recognize any variant of the existing logo in the logo database 108.

To detect and recognize the variant of the existing logo, the region based logo recognition module 116 first shortlists a potential logo candidate by identifying a region where the variant logo may be present in the pre-processed image. The region based logo recognition module 116 performs a two-step process to identify the region where the variant logo may be present. At the first step, the region based logo recognition module 116 may preform color segmentation process on the pre-processed image. In the color segmentation process, the Red, Green, and Blue (RGB) color-space format in the pre-processed image may be converted into LAB (L*a*b) color-space format. The LAB color-space format expresses color as three numerical values i.e. L* for the lightness and a* and b* for the green-red and blue-yellow color components. Thereafter, the region based logo recognition module 116 discards the L* component and performs color segmentation on the a* and b* component. In an embodiment of the present invention, the region based logo recognition module 116 may employ K-means clustering technique for color segmentation or classification where the optimal number of clusters may be identified using elbow method. Thereafter, at the second step, the region based logo recognition module 116 preforms texture segmentation of the segmented color components. Since the color components may correspond to both texts and symbols, the texture segmentation facilitates segmentation of the color components into text and symbol segments. In an embodiment of the present invention, the texture segmentation may be performed using Niblack method. The outcome of the two-step segmentation process indicates the texture and color of the content of the logo and thus, facilitates in shortlisting the potential logo candidate.

Once the potential logo candidate is available, the region based logo recognition module 116 detects and extracts edge features from the potential logo candidate. In an embodiment of the present invention, the region based logo recognition module 116 applies Convolutional Deep Neural Networks (CNNs) based filters to detect and extract edges of the potential logo candidate. It may be apparent to a person of ordinary skilled in the art that the region based logo recognition module 116 may have access to edges of the existing logos in the logo database 108. Thereafter, the region based logo recognition module applies a logo classification technique for detecting and recognizing the logo. In an embodiment of the present invention, the region based logo recognition module 116 applies K-Nearest Neighbor (K-NN) classifier for the purpose of classification of the edges of the potential logo candidate. The K-NN classifier identifies nearest neighbor for each potential logo based on the pre-defined value of K and classifies the edges of the potential logo candidate with the nearest neighbor from the existing logos in the logo database 108. Classification of the shortlisted potential logo with the nearest neighbor from the existing logos facilitates detection and recognition of the logo in the pre-processed image. The recognized logo and the associated information is then retrieved from the logo database 108 and is shared with the logo recognition controller 106. In an embodiment of the present invention, the logo recognition controller 106 may update the logo database 108 with the logo recognized by the region based logo recognition module 116. Updating the logo database 108 with the newly recognized logo that does not exist in the logo database 108, facilitates in scaling up the whole system of logo recognition in real time.

In embodiments of the present invention, once the logo in the image has been recognized, the recognized logo may facilitate in retail product metadata extraction. The retail product metadata may include, without any limitation, brand name and manufacturer name extraction. The retail product metadata extraction may facilitate in, without any limitation, trademark infringement detection, automated computation of brand-related statistics on social media, and counterfeit products identification. Further, in an embodiment of the present invention, the logo database updated with the variants of the existing logos may be deployed as a standalone application or as a Software as a Service (SaaS) for retail product metadata extraction from product label images.

Further, while each of the text based logo recognition module 110, the image based logo recognition module 112, the sign based logo recognition module 114, and the region based logo recognition module 116 identify the logo accurately from the received image, the time taken by the text based logo recognition module is less than the time taken by the image based logo recognition module, the time taken by the image based logo recognition module is less than the time taken by the sign based logo recognition module, and the time taken by the sign based logo recognition module is less than the time taken by the region based logo recognition module. Thus, the present invention improves the technology for recognition of the logos by employing the most appropriate logo recognition module based on the type of the logo and whether the system has prior knowledge of the logo or not, i.e. the case of variants of the existing logo that are not present in the logo database 108 and still getting recognized in real time.

Figure 2:
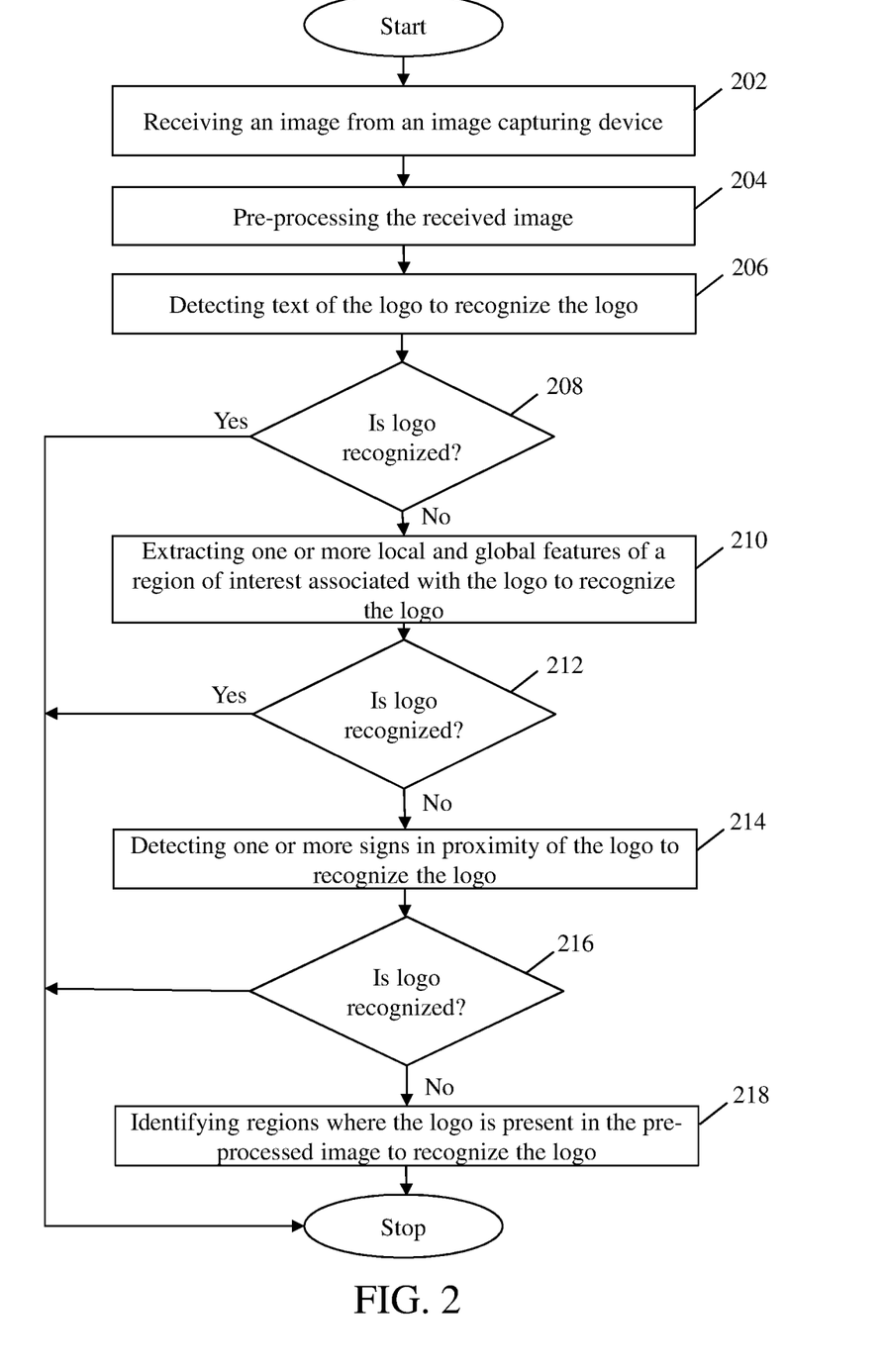
FIG. 2 is a flowchart illustrating a method for extracting a logo from an image in accordance with an embodiment of the present invention.

FIG. 2 is a flowchart illustrating a method for recognizing a logo from an image in accordance with an embodiment of the present invention. At step 202, an image comprising a logo is received from an image capturing device. The image may be captured in different lightning conditions to facilitate recognition of the logo using different image processing techniques. In exemplary embodiments of the present invention, the image may be of, without any limitation, a product, product packaging, and an advertising media where the logo may be present. The logo may be at least one of: a text based logo, a symbol based logo, and a combination of text and symbol. Further, in an embodiment of the present invention, the image capturing module may be a digital camera.

Thereafter, at step 204, the received image is pre-processed using image processing techniques. Pre-processing the received image removes unwanted or background regions, and extracts a Region of Interest (RoI) associated with the logo. In an exemplary embodiment of the present invention, the image processing technique may include, without any limitation, grayscale morphology to estimate the background and subtract it from the original image to extract the RoI The RoI facilitates accurate detection and recognition of the logo in the received image.

At step 206, text detection in the logo is performed to recognize the logo in the pre-processed image. In an embodiment of the present invention, the OCR technique may be applied to detect the text in the pre-processed image. In case the logo is in the form of the text, the logo gets detected in the image by the application of the OCR technique. Thereafter, the detected text of the logo is compared with text of existing logos present in a logo database. A match during the comparison process ascertains presence of the logo in the image and also corresponds to recognition of the logo. The comparison process is depicted in step 208. In case the comparison process does not indicate any match, the method proceeds to step 210. The failure in the matching process indicates that the logo is not a text based logo or doesn't contain any text and may be in the form of a symbol.

At step 210, features of the ROI in the pre-processed image are extracted to recognize the logo when the text is not detected in the logo. The features correspond to certain visual property of the pre-processed image. The features may include one or more local and global features. The global features describe visual content of the entire pre-processed image and comprise details about color, texture, and shape of the pre-processed image. The local features describe a patch within the pre-processed image and comprise keypoints and descriptors. In an embodiment of the present invention, the image based logo recognition module 112 applies a Joint Composite Descriptor (JCD) to extract 'color' and 'texture' features. The JCD is a combination of Color and Edge Directivity Descriptor (CEDD) & Fuzzy Color and Texture Histogram (FCTH) descriptors. The CEDD and FCTH jointly detect the color and texture features from the pre-processed image. The feature 'shape' is extracted using Gabor technique. The Gabor technique is implemented using a Gabor filter that analyses whether there are any specific frequency content in the image in specific directions in a localized region around the ROI. To extract the keypoints and descriptor, the logo recognition controller 106 employs Harris corner detector, and Oriented FAST and rotated BRIEF (ORB) techniques respectively. The ORB technique is a fusion of FAST (Features from Accelerated Segment Test) keypoint detector and BRIEF descriptor with one or more modifications to get a good accuracy. The ORB technique first employs the FAST keypoint descriptor to identify plurality of keypoints. Thereafter, the Harris corner detector is applied to find top keypoints from the plurality of keypoints to extract the local features. Once the one or more global and local features for the pre-processed image have been extracted, these one or more extracted features are compared with the one or more local and global features of the existing logos present in the logo database. A match during the comparison process, at step 212, ascertains presence of the logo in the image and also corresponds to recognition of the logo. In case the comparison process does not indicate any match, the method moves to step 214. In an embodiment of the present invention, a failure in match may be because of the logo being a variant of an existing logo present in the logo database. The variant logo may not be present in the logo database and thus, is not detected and recognized.

At step 214, one or more signs are detected in the pre-processed image to detect and recognize the variant of the existing logo when the logo is not recognized by extracting the one or more local and global features of the logo. The one or more signs may comprise Trademark (™) Registered (®), and Service Mark (℠). Since the one or more signs would be in proximity of desired logo, the detection of the one or more signs may facilitate in detection of the logo. In an embodiment of the present invention, an object detection technique may be employed to detect the one or more signs. In an exemplary embodiment of the present invention, the object detection technique may employ Viola-Jones object detection framework. The Viola-Jones framework may be trained for detecting the one or more signs using Histogram of Oriented Gradients (HOG) descriptor and a cascade classifier. The proximity sign detection reduces the search space and thus, accuracy in detecting and recognizing the logo increases. The detection of the one or more signs further facilitates shortlisting potential logo candidate using proximity based detection. Upon shortlisting of the potential logo candidate, edges or features of the potential logo are extracted. In an embodiment of the present invention, a deep neural network and deep autoencoders may be employed to extract the edges of the potential logo candidate. In an embodiment of the present invention, the deep neural network may be Convolutional Deep Neural Network (CNN) to detect and extract edges of the potential logo candidate. Thereafter, a classifier detects and recognizes the logo. In an embodiment of the present invention, K-Nearest Neighbor (K-NN) classifier may be employed for the purpose of classification of the edges of the potential logo candidate. The K-NN classifier identifies nearest neighbor for the potential logo based on the predefined value of K and classifies the edges of the potential logo candidate with the nearest neighbor from the existing logos. Classification of the potential logo candidate with the nearest neighbor from the existing logos facilitates detection and recognition of the logo in the pre-processed image. In an embodiment of the present invention, the existing logos may be updated with the recognized logo. Updating the existing logs with the newly recognized logo that does not exist in the logo database facilitates in scaling up the whole process of recognizing logos in real time. At step 216, if the K-NN classifier is unable to classify the potential logo candidate with the nearest neighbor from the existing logos and thus fails to recognize the logo, the method moves to step 218.

At step 218, a region or area where the logo may be present in the pre-processed image may be identified. The identification of the region may facilitate in shortlisting potential logo candidate for its recognition if the logo is not recognized by detecting the one or more signs in proximity of the logo. The segmentation may be performed in a two-step process to first identify the region where the variant logo may be present. At a first step, color segmentation process may be performed on the pre-processed image. In the color segmentation process, the Red, Green, and Blue (RGB) color-space format in the pre-processed image may be converted into LAB (L*a*b) color-space format. The LAB color-space format expresses color as three numerical values i.e. L* for the lightness and a* and b* for the green-red and blue-yellow color components. Thereafter, the region based logo recognition module 116 discards the L* component and performs color segmentation on the a* and b* component. In an embodiment of the present invention, K-means clustering technique may be employed for color segmentation or classification where the number of clusters may be identified using elbow method. Thereafter, at the second step, texture segmentation of the segmented color components is performed. Since the color components may correspond to both texts and symbols, the texture segmentation facilitates segmentation of the color components into text and symbol segments. In an embodiment of the present invention, the texture segmentation may be performed using Niblack method. The outcome of the two-step segmentation process may indicate the texture and color of the content of the logo and thus, facilitates in shortlisting the potential logo candidate.

Once the shortlisted potential logo candidate is available, detection and extraction of edges or features is performed from the potential logo candidate. In an embodiment of the present invention, a deep neural network and deep autoencoders may be employed to extract the edges of the potential logo candidate. In an embodiment of the present invention, the deep neural network may be Convolutional Deep Neural Network (CNN) to detect and extract edges of the potential logo candidate. Thereafter, a classifier detects and recognizes the logo. In an embodiment of the present invention, K-Nearest Neighbor (K-NN) classifier may be employed for the purpose of classification of the edges of the potential logo candidate. The K-NN classifier identifies nearest neighbor for the potential logo based on the predefined value of K and classifies the edges of the potential logo candidate with the nearest neighbor from the existing logos. Classification of the potential logo candidate with the nearest neighbor from the existing logos facilitates detection and recognition of the logo in the pre-processed image. In an embodiment of the present invention, the existing logos in the logo database may be updated with the recognized logo. Updating the logo database with the newly recognized logo that does not exist in the logo database facilitates in scaling up the whole process of recognizing logos in real time.

In embodiments of the present invention, once the logo in the image has been recognized, the recognized logo may facilitate in retail product metadata extraction. The retail product metadata may include, without any limitation, brand name and manufacturer name extraction. The retail product metadata extraction may facilitate in, without any limitation, trademark infringement detection, automated computation of brand-related statistics on social media, and counterfeit products identification. Further, in an embodiment of the present invention, the logo database updated with the variants of the existing logos may be deployed as a standalone application or as a Software as a Service (SaaS) for retail product metadata extraction from product label images.

Figure 3:
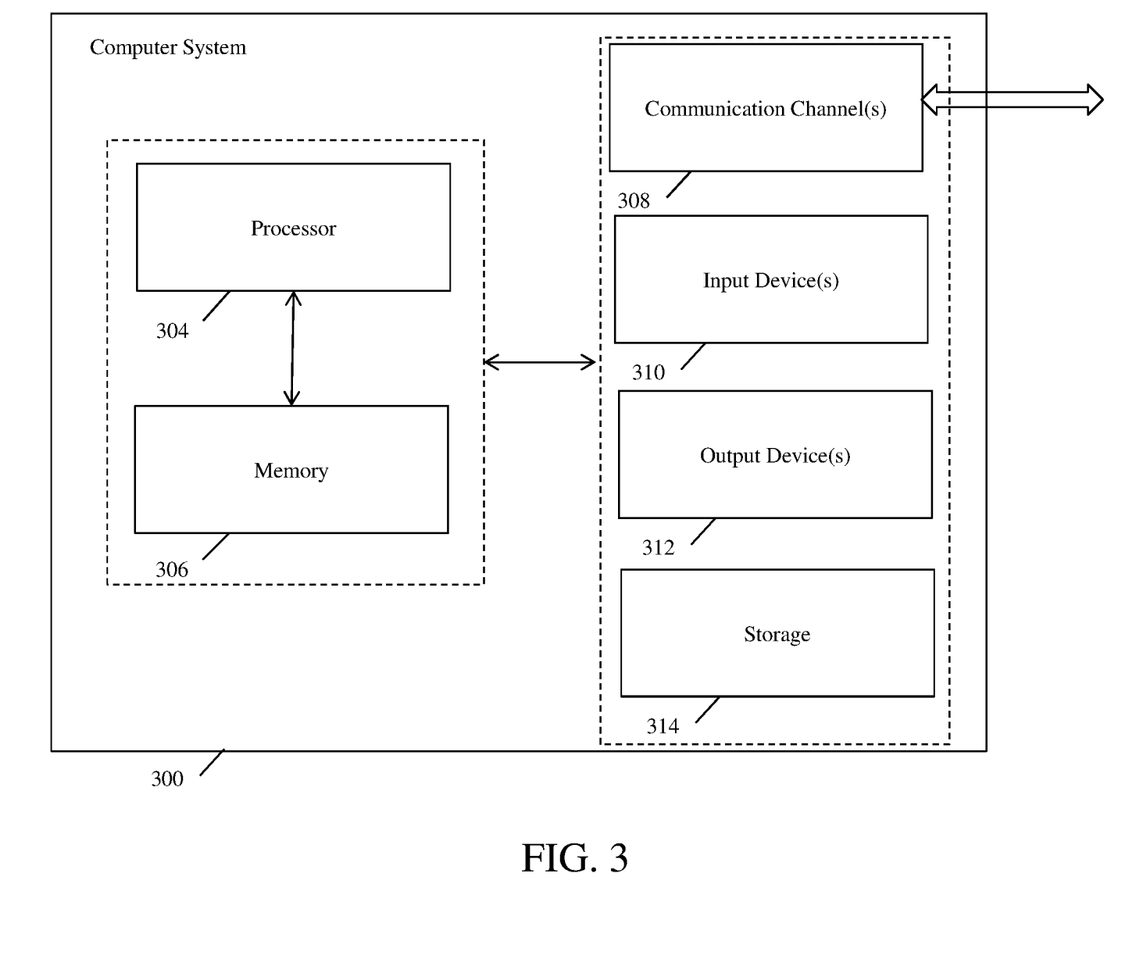
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and may be a physical processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, mutli-core Graphics Processing Unit (GPU) to run deep learning models, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for recognizing a logo from an image, the system comprising:
    a memory storing program instructions; a processor configured to execute program instructions stored in the memory;
    an image processing module executed by the processor and configured to receive an image from an image capturing device and pre-process the received image, wherein the received image comprises a logo to be recognized;
    a logo database comprising a plurality of logos; and
    a logo recognition controller executed by the processor and configured to receive the pre-processed image and sequentially send the pre-processed image to:
    a text based logo recognition module executed by the processor and configured to recognize the logo by detecting text of the logo present in the pre-processed image;
    an image based logo recognition module executed by the processor and configured to recognize the logo by extracting one or more local and global features of a region of interest associated with the logo present in the pre-processed image if the text based logo recognition module fails to recognize the logo;
    a sign based logo recognition module executed by the processor and configured to recognize the logo by detecting one or more signs in proximity of the logo present in the pre-processed image if the image based logo recognition module fails to recognize the logo; and
    a region based logo recognition module executed by the processor and configured to recognize the logo by identifying regions where the logo is present in the pre-processed image if the sign based logo recognition module fails to recognize the logo.

2. The system of claim 1, wherein the logo in the received image is at least one of: a text based logo, a symbol based logo, and a combination of text and symbol.

3. The system of claim 1, wherein the logo in the received image is one of:
    a logo existing in the logo database; and
    a variant of the existing logo that is absent in the logo database.

4. The system of claim 1, wherein the text based logo recognition module is configured to detect the text using optical character recognition technique, further wherein upon detecting the text, the text based logo recognition module is configured to compare the detected text with text of the logos present in the logo database such that a match corresponds to the recognition of the logo.

5. The system of claim 1, wherein the image based logo recognition module is further configured to compare the extracted one or more local and global features of the region of interest with the one or more local and global features of the existing logos present in the logo database such that a match corresponds to the recognition of the log.

6. The system of claim 1, wherein the sign based logo recognition module is configured to detect the one or more signs through an object detection technique, the detection of the one or more signs shortlists the logo as a potential logo.

7. The system of claim 6, wherein the sign based logo recognition module is further configured to extract edges of the potential logo and classify the extracted edges with the edges of a nearest neighbor from the existing logos, wherein the classification of the extracted edges of the potential logo candidate with the edges of the nearest neighbor from the existing logos facilitates in recognition of the logo present in the pre-processed image.

8. The system of claim 1, wherein the region based logo recognition module is configured to identify regions by applying color segmentation and texture segmentation techniques, further wherein identification of the regions facilitates in shortlisting a potential logo candidate.

9. The system of claim 8, wherein the region based logo recognition module is further configured to extract edges of the potential logo candidate and classify the extracted edges with the edges of a nearest neighbor from the existing logos, wherein the classification of the extracted edges of the potential logo candidate with the edges of the nearest neighbor from the existing logos facilitates in recognition of the logo present in the pre-processed image.

10. The system of claim 1, wherein the logo database is updated with the logo recognized by one of: the sign based logo recognition module and the region based logo recognition module.

11. A method for recognizing a logo from an image, wherein the method is implemented by a processor executing instructions stored in a memory, the method comprising:
    receiving an image from an image capturing device, wherein the received image comprises the logo to be recognized;

pre-processing the received image;
detecting text of the logo to recognize the logo present in the pre-processed image;
extracting one or more local and global features of a region of interest associated with the logo to recognize the logo present in the pre-processed image;
detecting one or more signs in proximity of the logo to recognize the logo present in the pre-processed image; and
identifying a region where the logo is present in the pre-processed image to recognize the logo.

12. The method of claim 11, wherein the logo in the received image is at least one of: a text based logo, a symbol based logo, and a combination of text and symbol.

13. The method of claim 11, wherein the logo in the received image is one of:
a logo existing in a logo database; and
a variant of the existing logo that is absent in the logo database.

14. The method of claim 11, wherein detection of the text is achieved using optical character recognition technique, further wherein upon detecting the text, the detected text is compared with text of logos present in a logo database such that a match corresponds to the recognition of the logo.

15. The method of claim 11, wherein the extracted one or more local and global features of the region of interest are compared with the one or more local and global features of existing logos present in a logo database such that a match corresponds to the recognition of the logo.

16. The method of claim 15, further comprises extracting edges of the potential logo and classifying the extracted edges with the edges of a nearest neighbor from logos existing in a logo database, wherein the classification of the extracted edges of the potential logo candidate with the edges of the nearest neighbor from the logos existing in the logo database facilitates in the recognition of the logo present in the pre-processed image.

17. The method of claim 16 further comprises extracting edges of the potential logo candidate and classifying the extracted edges with the edges of a nearest neighbor from logos existing in a logo database, wherein the classification of the extracted edges of the potential logo candidate with the edges of the nearest neighbor from the logos existing in the logo database facilitates in the recognition of the logo present in the pre-processed image.

18. The method of claim 11, wherein the one or more signs are detected through an object detection technique, the detection of the one or more signs shortlists the logo as a shortlisted potential logo.

19. The method of claim 11, wherein the regions where the logo is present in the pre-processed image is identified by color segmentation and texture segmentation of the pre-processed image, further wherein identification of the regions facilitates in shortlisting a potential logo candidate.

20. A computer program product comprising:
a non-transitory computer-readable medium having computer-readable program code stored thereon, the computer-readable program code comprising instructions that when executed by a processor, cause the processor to:
receive an image from an image capturing device, wherein the received image comprises the logo to be recognized;
pre-process the received image;
detect text of the logo to recognize the logo present in the pre-processed image;
extract one or more local and global features of a region of interest associated with the logo to recognize the logo present in the pre-processed image;
detect one or more signs in proximity of the logo to recognize the logo present in the pre-processed image; and
identify regions where the logo is present in the pre-processed image to recognize the logo present in the pre-processed image.

* * * * *